(12) United States Patent
Nakaminami et al.

(10) Patent No.: US 6,609,448 B2
(45) Date of Patent: Aug. 26, 2003

(54) HEADSTOCK GUIDE UNIT FOR A MACHINE TOOL

(75) Inventors: Masamitsu Nakaminami, Yamatokoriyama (JP); Jun Adachi, Yamatokoriyama (JP)

(73) Assignee: Mori Seiki Co., Ltd., Yamatokoriyama (JP)

( * ) Notice: Subject to any disclaimer, the term of this patent is extended or adjusted under 35 U.S.C. 154(b) by 0 days.

(21) Appl. No.: 09/954,223

(22) Filed: Sep. 18, 2001

(65) Prior Publication Data

US 2002/0033084 A1 Mar. 21, 2002

(30) Foreign Application Priority Data

Sep. 18, 2000 (JP) .......................... 2000-281323

(51) Int. Cl.⁷ .............................. B23B 7/00; B23B 9/00
(52) U.S. Cl. .............................. 82/120; 82/121; 82/142
(58) Field of Search ............................ 82/118, 119, 120, 82/121, 129, 132, 133, 136, 138, 142, 149

(56) References Cited

U.S. PATENT DOCUMENTS

| | | | | |
|---|---|---|---|---|
| 3,635,109 A | * | 1/1972 | Jacobson | 82/122 |
| 4,413,539 A | * | 11/1983 | Ishizuka et al. | 82/120 |
| 4,800,789 A | * | 1/1989 | Nakano | 82/131 |
| 5,127,140 A | * | 7/1992 | Oiwa et al. | 29/27 C |
| 5,644,961 A | * | 7/1997 | Nishio et al. | 82/127 |
| 6,257,108 B1 | * | 7/2001 | Otake | 82/1.11 |

* cited by examiner

*Primary Examiner*—Henry W. H. Tsai
(74) *Attorney, Agent, or Firm*—Smith Patent Office

(57) ABSTRACT

A machine tool comprises a fixed bed; a carriage with a tool post mounted thereon is provided on the fixed bed on one side; and a headstock is provided on another side so that the headstock is connected to a headstock base and is movable between a workpiece machining position for machining a workpiece and a workpiece loading/unloading position for loading or unloading a workpiece. The tool also includes a chip collecting space disposed in a cut out portion of the fixed bed adjacent to the workpiece loading/unloading position and a headstock guide unit comprising a guide support mechanism for supporting a front portion of the headstock base by the fixed bed when the headstock base is positioned at the workpiece machining position, and for supporting a rear portion of the headstock base by the fixed bed when the headstock base is positioned at the workpiece loading/unloading position.

4 Claims, 11 Drawing Sheets

HEADSTOCK GUIDE UNIT FOR A MACHINE TOOL

BACKGROUND OF THE INVENTION

1. Field of the Invention

The present invention relates to a headstock guide unit for a machine tool where a carriage with a tool post mounted thereon is disposed on a fixed bed on one side thereof that is closer to an operator while a headstock for loading a workpiece thereon is provided on the other side of the fixed bed farther from the operator.

2. Discussion of the Related Art

Conventionally a mass-production type machine tool (such as a Numerically Controlled lathe also called an NC lathe) has carriages with a tool post mounted on each carriage are provided on the left and right sides of the front side (nearer side to the operator) of the fixed bed. The carriages are movable in X- and Z-axis directions, respectively, while a headstock is disposed on the side farther from the operator between the two tool posts.

With this type of NC lathe, a workpiece is mounted on the spindle of the headstock. The workpiece is then subjected to a specified cutting process by moving the left-and-right carriages and the tool post relative to each other while rotationally driving the workpiece.

With this conventional machine tool, because the headstock is fixedly disposed on the rear side of the left-and-right tool posts, the task of replacing the workpiece of the spindle would inevitably be performed deep in the side of the fixed bed. This results in a problem of poor replacement workability.

Also in this conventional machine tool, there are some cases where the chips generated by the workpiece machining are discharged on the side closer to the operator. In such a case, the chips are more likely to interfere with the workpiece loading/unloading tasks, further lowering the workability of the replacement tasks.

In this connection, from the viewpoint of enabling an easy replacement of the workpiece, the present inventors have developed a machine tool which comprises a headstock disposed on a headstock base, the headstock base being movable between a workpiece machining position on one side (farther from the operator) and a workpiece loading/unloading position on the other side (closer to the operator), and a chip collecting space is provided at a location of the fixed bed corresponding to the workpiece loading/unloading position.

With this machine tool, it is possible to perform the workpiece loading/unloading replacement tasks in proximity to the operator on the front side of the fixed bed. Additionally, since the chips generated by the workpiece machining operations drop into the chip collecting space of the fixed bed, it is possible to prevent these chips from interfering with the workpiece loading/unloading tasks.

When a chip collecting space is formed in a location of the fixed bed corresponding to the workpiece loading/unloading position, the headstock is supported on one side by the headstock base at the workpiece loading/unloading position. This ensures support rigidity and support strength for the headstock in the workpiece loading/unloading position.

SUMMARY OF THE INVENTION

The present invention has been accomplished in view of these conventional devices.

An object of the present invention is to provide a headstock guide unit for a machine tool that allows the workpiece loading/unloading work to be easily achieved and that allows support strength and support rigidity during its support of the headstock in the workpiece loading/unloading position to be ensured.

In order to achieve the above and other objects of the invention, there is provided a machine tool that comprises a fixed bed; a carriage with a tool post mounted thereon is provided on the fixed bed on one side; and a headstock is provided on another side so that the headstock is connected to a headstock base and is movable between a workpiece machining position for machining a workpiece and a workpiece loading/unloading position for loading or unloading a workpiece. The tool also includes a chip collecting space disposed in a cut out portion of the fixed bed adjacent to the workpiece loading/unloading position and a headstock guide unit comprising a guide support mechanism for supporting a front portion of the headstock base by the fixed bed when the headstock base is positioned at the workpiece machining position, and for supporting a rear portion of the headstock base by the fixed bed when the headstock base is positioned at the workpiece loading/unloading position.

In a second aspect of the invention, the headstock guide unit for a machine tool as described in the first aspect has a guide support mechanism that comprises rails disposed so as to extend along left-and-right edge portions of the chip collecting space of the fixed bed; and guides disposed on the headstock base and slidably engaged with the rails.

In a third aspect of the invention, in the headstock guide unit for a machine tool as described in the first aspect has a guide support mechanism that includes a first cam follower disposed on the fixed bed in rolling contact with a front lower surface of the headstock base; and a second cam follower disposed at a rear portion of the fixed bed, rearwardly of the first cam follower, in rolling contact with a rear upper surface of the headstock base.

With the headstock guide unit according to the present invention, since the headstock is fixed to the headstock base and since the headstock base movable between the workpiece machining position on one side and the workpiece loading/unloading position on the other side, the task of loading and unloading the workpiece can be carried out in a location in proximity to the operator on the front side of the fixed bed. This allows the workpiece loading/unloading workability to be improved.

Also in this invention, since the chip collecting space is provided in a portion of the fixed bed corresponding to the workpiece loading/unloading position, the chips generated by the workpiece machining operations drop into the chip collecting space of the fixed bed. Thus, it is possible to prevent the chips from interfering with the workpiece loading/unloading tasks, and therefore the workability is improved.

Furthermore, in the present invention, since the headstock guide unit further comprises a guide support mechanism for supporting a front portion of the headstock base by the fixed bed when the headstock base is positioned at the workpiece machining position, and for supporting a rear portion of the headstock base by the fixed bed in the workpiece loading/unloading position, support rigidity and support strength for the headstock in the workpiece machining position can be ensured. Moreover the headstock can be moved to the workpiece loading/unloading position without any obstacles.

Also, according to the second aspect of the invention, since the guide support mechanism comprises rails disposed on left-and-right edge portions of the chip collecting space of the fixed bed, and guides disposed on the headstock base and slidably engaged with the rails, the headstock base can be securely supported while sliding along the guides and the rails even when the headstock base overhangs the workpiece during the loading/unloading process.

Also, according to the third aspect of the invention, since the guide support mechanism comprises a first cam follower in rolling contact with a front lower surface of the headstock base and a second cam follower in rolling contact with a rear upper surface of the headstock base, the headstock base can be supported so as to be movable between the workpiece loading/unloading position and the workpiece machining position at a low cost and with a simple construction.

BRIEF DESCRIPTION OF THE DRAWINGS

The above and other objects and features of the present invention will be clearly understood from the following description with respect to the preferred embodiment thereof when considered in conjunction with the accompanying drawings and diagrams, in which.

DETAILED DESCRIPTION OF THE PREFERRED EMBODIMENTS

Figure 1:
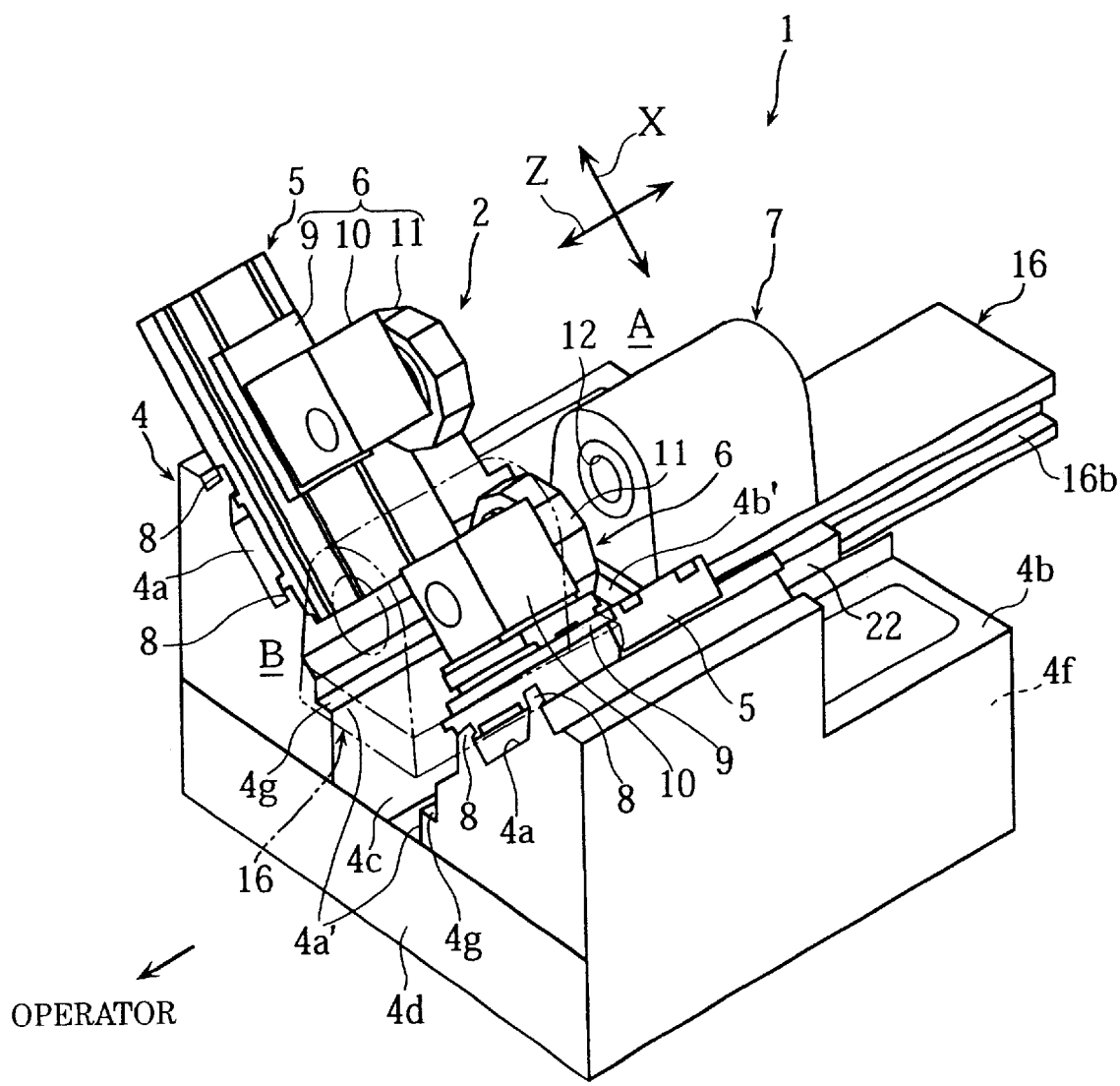
FIG. 1 is a perspective view of the machine body of an NC lathe according to an embodiment of the invention, as viewed from an oblique front side.
Figure 2:
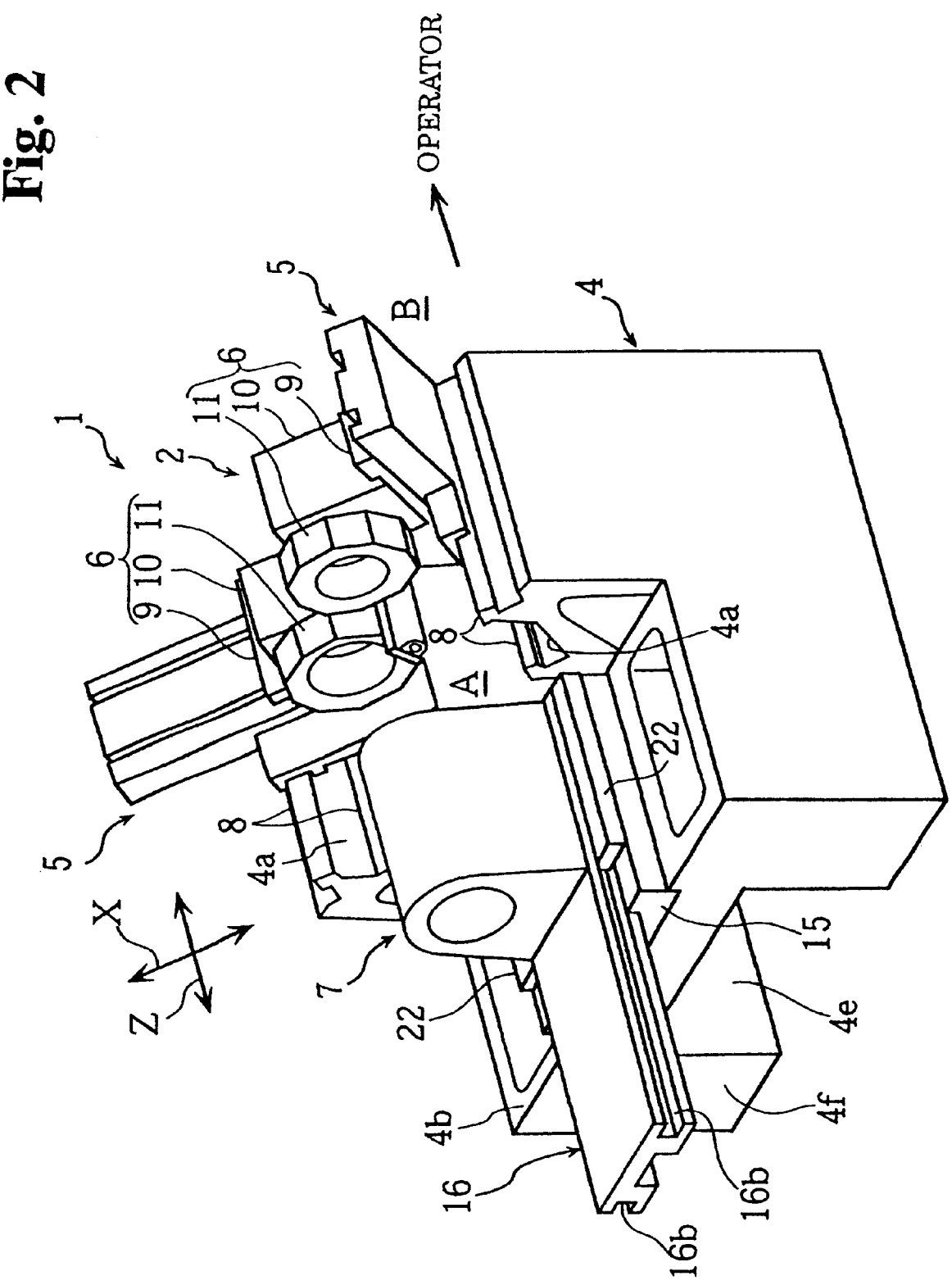
FIG. 2 is a perspective view of the machine body as viewed from an oblique rear side according to an embodiment of the invention.

Hereinbelow, embodiments of the present invention are described with reference to the accompanying drawings.

FIGS. 1 through 8 are views for explaining a machine tool (NC lathe) in accordance with the embodiments of the invention. The terms, front and rear, left and right, are referred to in this embodiment as they are viewed from the operator side, that is, the near side means the front, the farther side means the rear, the left side means the left, and the right side means to the right of the operator.

Referring to the figures, reference numeral 1 denotes a machine tool such as an NC lathe that is to be used, for example, to machine aluminum wheels. The NC lathe 1 is constructed so that its machine body 2 is externally surrounded by a cover 3. In this machine body 2, as viewed from the operator, carriages 5 are provided on the left and right sides of a front end portion (on one side nearer the operator) of a fixed bed 4 so as to be movable in a Z-axis direction (back-and-forth direction). Tool posts 6 are mounted on the individual carriages 5, respectively, so as to be movable in an X-axis direction (oblique left-and-right directions), and a headstock 7 is disposed on the rear side (on the side farther from the operator) of the fixed bed 4 between the left-and-right carriages 5 so as to have its axis line directed along the Z-axis direction and be movable in the Z-axis direction.

The fixed bed 4 is formed as a generally rectangular shaped parallelepiped by casting. Left-and-right sloped portions 4a are formed in a front portion of this fixed bed 4 so as to form a V shape as viewed in a front view, while a flat portion 4b stepped down from the sloped portions 4a is formed in the rear portion.

A recessed portion 4c for use in chip collection is formed as a cut-out in the front portion of the fixed bed 4. This recessed portion 4c is surrounded by lower end portions 4a' of the sloped portions 4a, a front end portion 4b' of the flat portion 4b and a front end wall 4d of the fixed bed 4. Also, a tunnel 4e is formed within the flat portion 4b so as to communicate with the recessed portion 4c, and a rear end of the tunnel 4e is opens outwardly from a rear end wall 4f of the fixed bed 4. The recessed portion 4c and the tunnel 4e comprise a chip collecting passage through which chips occurring during the workpiece machining operation are discharged rearwardly on one side of the fixed bed 4 that is opposite to the operator.

The carriages 5 are provided along the left-and-right sloped portions 4a, and each of the carriages 5 is slidably supported by a pair of upper-and-lower guide surfaces 8 formed in the sloped portion 4a. The carriage 5 is reciprocatingly driven in the Z-axis direction by a drive mechanism (not shown) such as a servomotor and ball screw.

Each of the tool posts 6 is generally structured so that a tool post body 10 is fixed on a tool post base 9 slidably supported by the carriage 5. Also, a turret head 11 with a plurality of tools mounted thereon is rotationally indexably provided on the rear face of the tool post body 10. The tool post base 9 is reciprocatingly driven in the X-axis direction by a drive mechanism (not shown) such as a servomotor and ball screw.

The headstock 7, which is generally hemi-elliptically formed when viewed in a front view, has a spindle 12 inserted therein and is rotatably supported by a plurality of bearings (not shown). A chuck 13 for gripping a workpiece W is mounted on this spindle 12 and is driven into rotation by a spindle drive motor (not shown).

Figure 5:
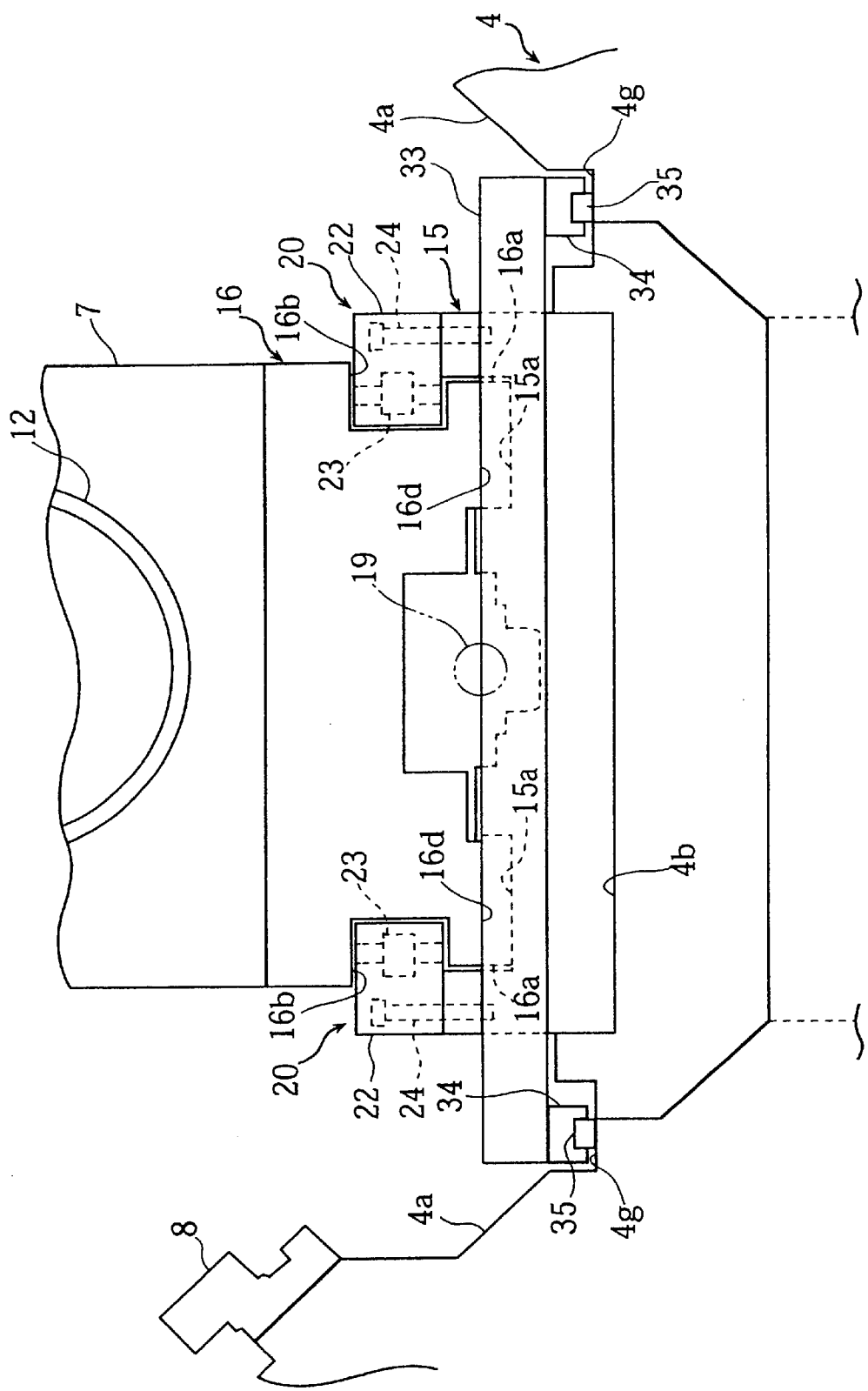
FIG. 5 is a front view of a headstock guide unit of the NC lathe according to an embodiment of the invention.

As shown in FIG. 5, a fixed base 15 is fixedly attached on the top of the flat portion 4b of the fixed bed 4. Further, slide recessed portions 15a, extending in the back-and-forth direction, are formed on left-and-right side portions of the fixed base 15. A headstock base 16 is provided on this fixed base 15 so as to be movable in the Z-axis direction. This headstock base 16 has a rectangular plate shape that extends in the back-and-forth direction and has the headstock 7 fixedly mounted thereon in a front portion thereof. Further, a rear portion thereof extends so as to protrude and overhang rearwardly from the rear end of the flat portion 4b.

Protruding portions 16a slidably engage with the slide recessed portions 15a, respectively. Further, they are formed at both left-and-right end portions of the underside of the headstock base 16 so that lower face and inner side face of each protruding portion 16a are in surface contact with an upper face and an inner side face of the slide recessed portion 15a. The headstock base 16 is reciprocatingly driven by rotationally driving a ball screw 19 provided in the fixed base 15 with a servomotor (not shown). The headstock 7 is movable between a workpiece machining position A where the workpiece W is machined on the flat portion 4b on the side farther from the operator, and a workpiece loading/unloading position B where the machined workpiece is replaced with the next workpiece above the recessed portion 4c on the side nearer the operator.

In this arrangement, when the headstock base 16 is at the workpiece machining position A, the front portion of the headstock base 16 where the headstock 7 is mounted is supported by the fixed base 15. When the headstock base 16 is at the workpiece loading/unloading position B, the rear portion of the headstock base 16 extending and overhanging rearwardly from the front portion where the headstock 7 is supported by the fixed base 15.

First and second clamping mechanisms 20 and 21 for positioning and clamping the headstock base 16 to the fixed bed 4 are provided on the fixed bed 4. The first clamping mechanisms 20 are provided on both the left-and-right side portions of the headstock base 16, and the second clamping mechanism 21 is provided only on the left side portion of the headstock base 16, see FIG. 4.

Figure 7:
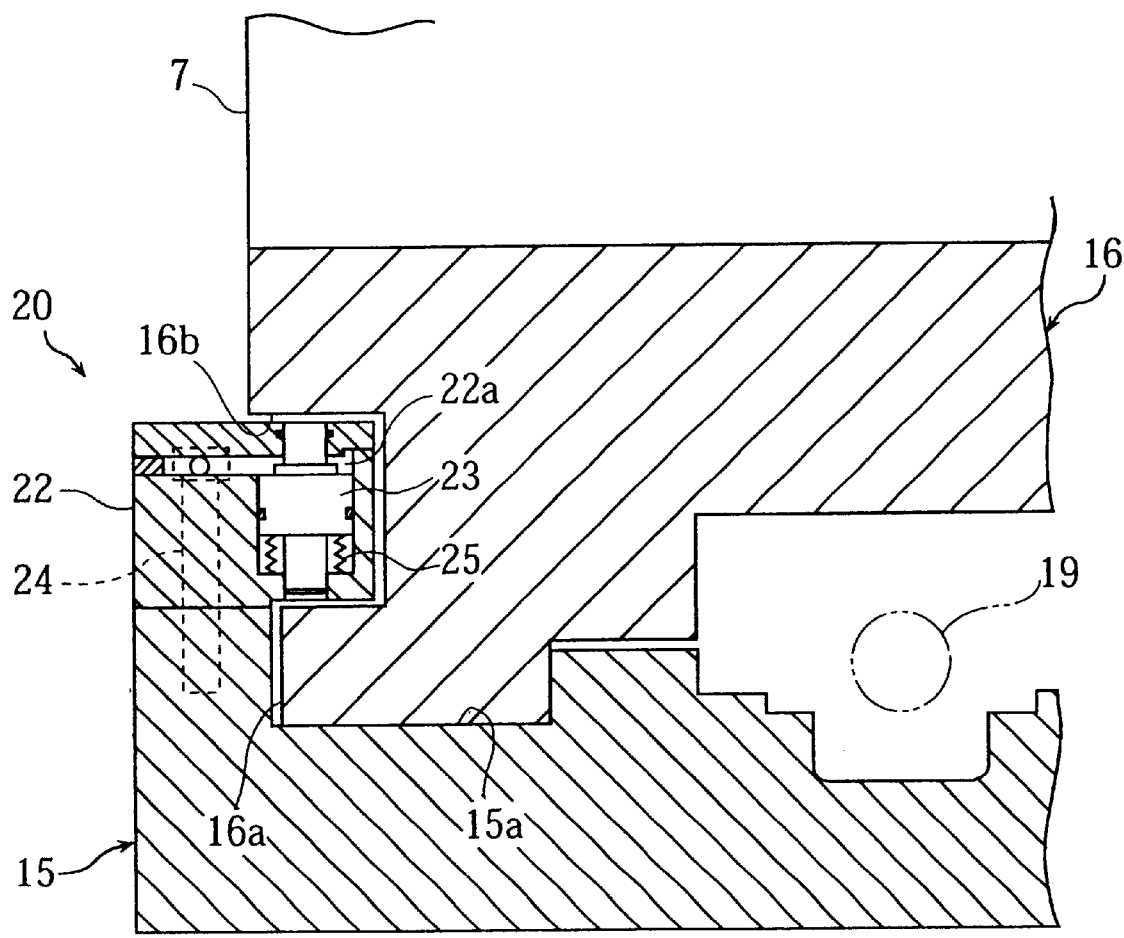
FIG. 7 is a sectional view of a first clamp mechanism of the machine body according to an embodiment of the invention.

As shown in FIG. 7, the first clamping mechanisms 20 are generally structured so that four pistons 23 are inserted within one hydraulic cylinder block 22 so as to be slidable up and down. The hydraulic cylinder block 22 is fixed at the left-and-right end portions of the top face of the fixed base 15 with a plurality of bolts 24.

A portion of the hydraulic cylinder block 22 including the pistons 23 is inserted and placed within a recessed portion 16b recessed in a side wall of the headstock base 16 in a contactless manner so that the pistons 23 are opposed to the protruding portion 16a of the headstock base 16. When oil pressure is supplied to an oil chamber 22a of the hydraulic cylinder block 22, the pistons 23 go down, pressing and fixing the headstock base 16 to the fixed base 15. When the oil pressure is released, a spring 25 makes the pistons 23 go up so that the clamping force is released.

Figure 8:
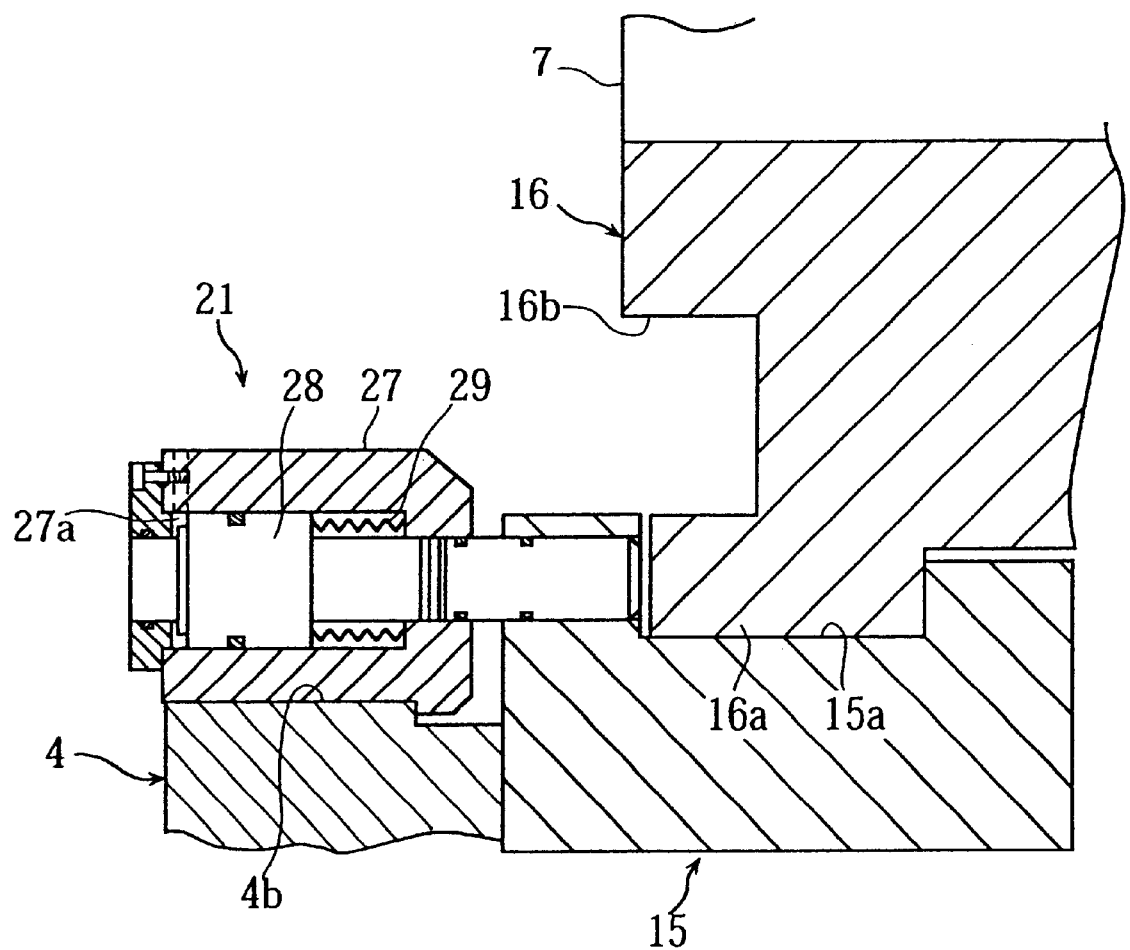
FIG. 8 is a sectional view of a second clamp mechanism of the machine body according to an embodiment of the invention.

As shown in FIG. 8, the second clamping mechanism 21 comprises three hydraulic cylinders 27 placed in parallel and fixedly bolted on top of the flat portion 4b of the fixed bed 4. A piston 28 is inserted within each hydraulic cylinder 27 so as to be horizontally slidable. Each of these pistons 28 is opposed to the left side face of the protruding portion 16a of the headstock base 16 through the fixed base 15.

When oil pressure is supplied to an oil chamber 27a of each hydraulic cylinder 27, each piston 28 advances rightwardly to press and fix the headstock base 16 to the fixed base 15. When the oil pressure is released, the springs 29 make the piston 28 retreat so that the clamping force is released.

The fixed bed 4 is equipped with a headstock guide unit for guiding and supporting the headstock base 16 between the workpiece machining position A and the workpiece loading/unloading position B. This headstock guide unit has the following structure.

In the front face of the headstock base 16 a prismatic support member 33 extending widthwise is provided. Also, the support member 33 is fixedly positioned by being coupled with the cutout portions 16d formed by cutting out the headstock base 16 along its front lower edge. Guides 34 are fixed at both left-and-right end portions of the lower face of the support member 33.

At the lower end portions 4a' of the left-and-right sloped portions 4a of the fixed bed 4, planar portions 4g are formed in a stepped-down shape so as to extend in the back-and-forth direction along the lower end portions 4a'. Rails 35 are fixedly bolted on the upper surface of these left-and-right planar portions 4g, and the guides 34 are slidably engaged with these rails 35.

Figure 6:
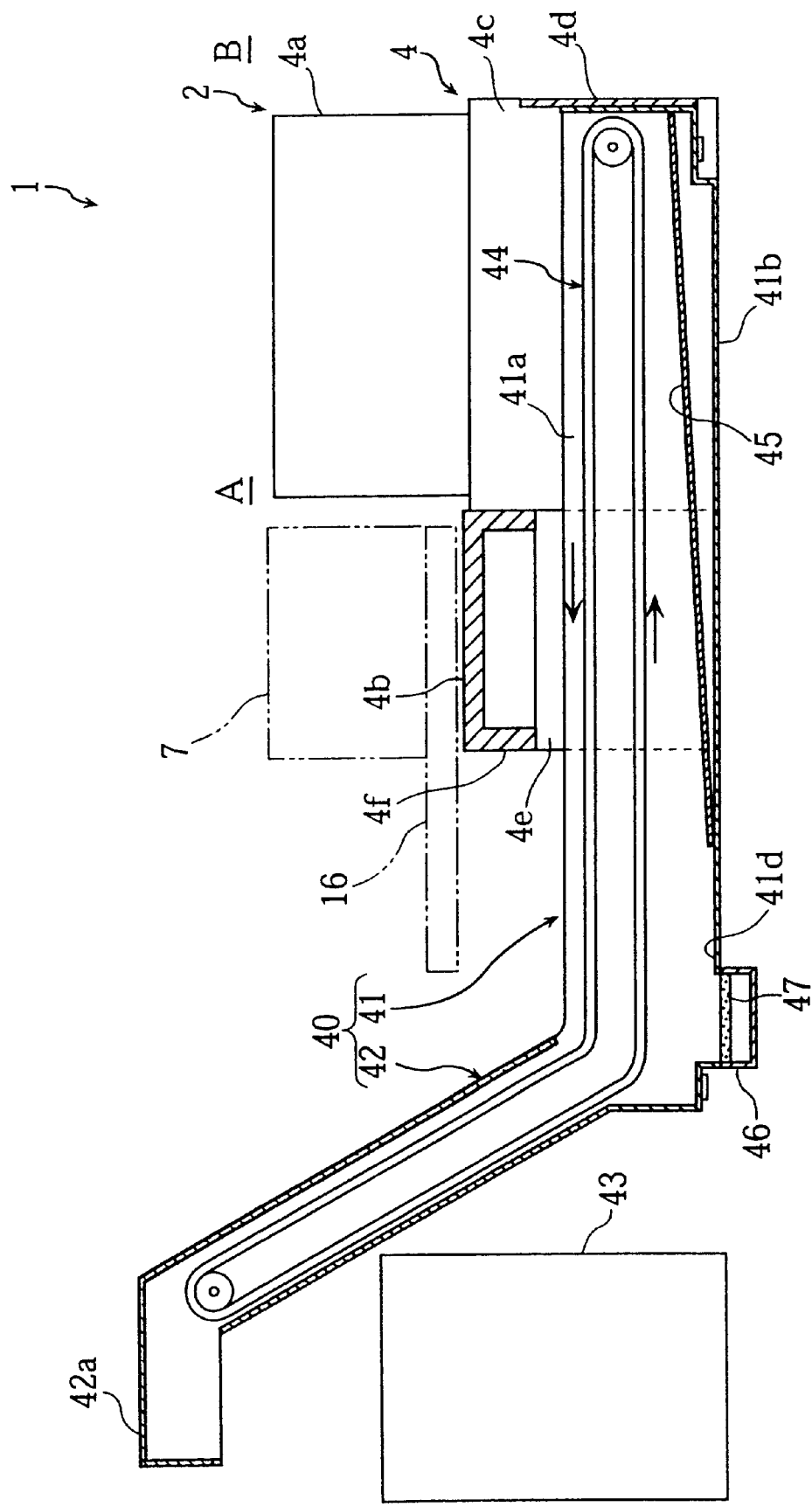
FIG. 6 is a side view of a chip processing unit of the NC lathe according to an embodiment of the invention.

At the bottom of the fixed bed 4, as shown in FIG. 6, a chip processing unit is provided for collecting and discharging coolant supplied to the cutting portion of the workpiece and chips generated during the machining. The structure of the chip processing unit is described below.

A coolant tank 40 is provided within a chip collecting passage defined by the recessed portion 4c and the tunnel 4e of the fixed bed 4. This coolant tank 40 extends over the entire length of the recessed portion 4c and the tunnel 4e. The coolant tank 40 is further equipped with a tank body 41 extending rearwardly from the rear end wall 4f of the fixed bed 4 of the machine, and a discharge duct portion 42 rising up and extending obliquely and rearwardly from the rear end of the tank body 41.

The tank body 41 is made up of left-and-right side walls 41a and a bottom wall 41b and is formed into an upward-opening box shape. The discharge duct portion 42 is formed into a cylindrical shape with its rear end portion 42a opening downwardly. Below the opening of this rear end portion 42a, a chip collecting bucket 43 is provided.

An endless chip conveyor 44 is provided within the coolant tank 40 so as to extend over the entire length thereof. The chip conveyor 44 is rotationally driven by a drive motor (not shown). This chip conveyor 44 is a strip conveyor made up by hinge-connecting a multiplicity of thin strip plates to one another. The chip conveyor 44 serves to collect and convey chips that have dropped into the coolant tank 40 while letting coolant and fine chips drop to the bottom wall portion 41b.

At the bottom wall portion 41b of the tank body 41, a sloped plate 45 is provided for cleaning away coolant and chips that have dropped through the chip conveyor 44 to a downstream end portion 41d of the tank body 41. The sloped plate 45 is sloped from the front to the rear side. Also, a resin film (not shown) is provided for smoothing the sliding of the chips. The film covers the upper surface of the sloped plate 45 and thereby the chips are prevented from sticking without increasing the slope angle by virtue of the resin film.

A coolant collecting passage 46 communicates and connects to the downstream end portion 41d of the tank body 41, and a filter 47 for filtrating the chips at an inlet of the collecting passage 46 is provided. This collecting passage 46 communicates and connects a clean tank (not shown) provided, for example, in a separate chamber, so that the coolant is collected in the clean tank.

Chips and coolant generated during the machining operation drop into the tank body 41 within the recessed portion 4c and the chips are conveyed out of the machine by the chip conveyor 44 and collected in the collecting bucket 43.

Meanwhile, the coolant and the chips that have passed through the chip conveyor 44 drop onto the sloped plate 45 and the coolant naturally flows along this sloped plate 45. Then, this flow of coolant also causes the chips to be cleaned away to the downstream end portion 41d. The chips that are cleaned-away in the coolant are filtered by the filter 47 and are periodically collected. Further, the coolant from which the chips have been filtered away passes through the coolant collecting passage 46, and is collected in the clean tank.

Figure 3:
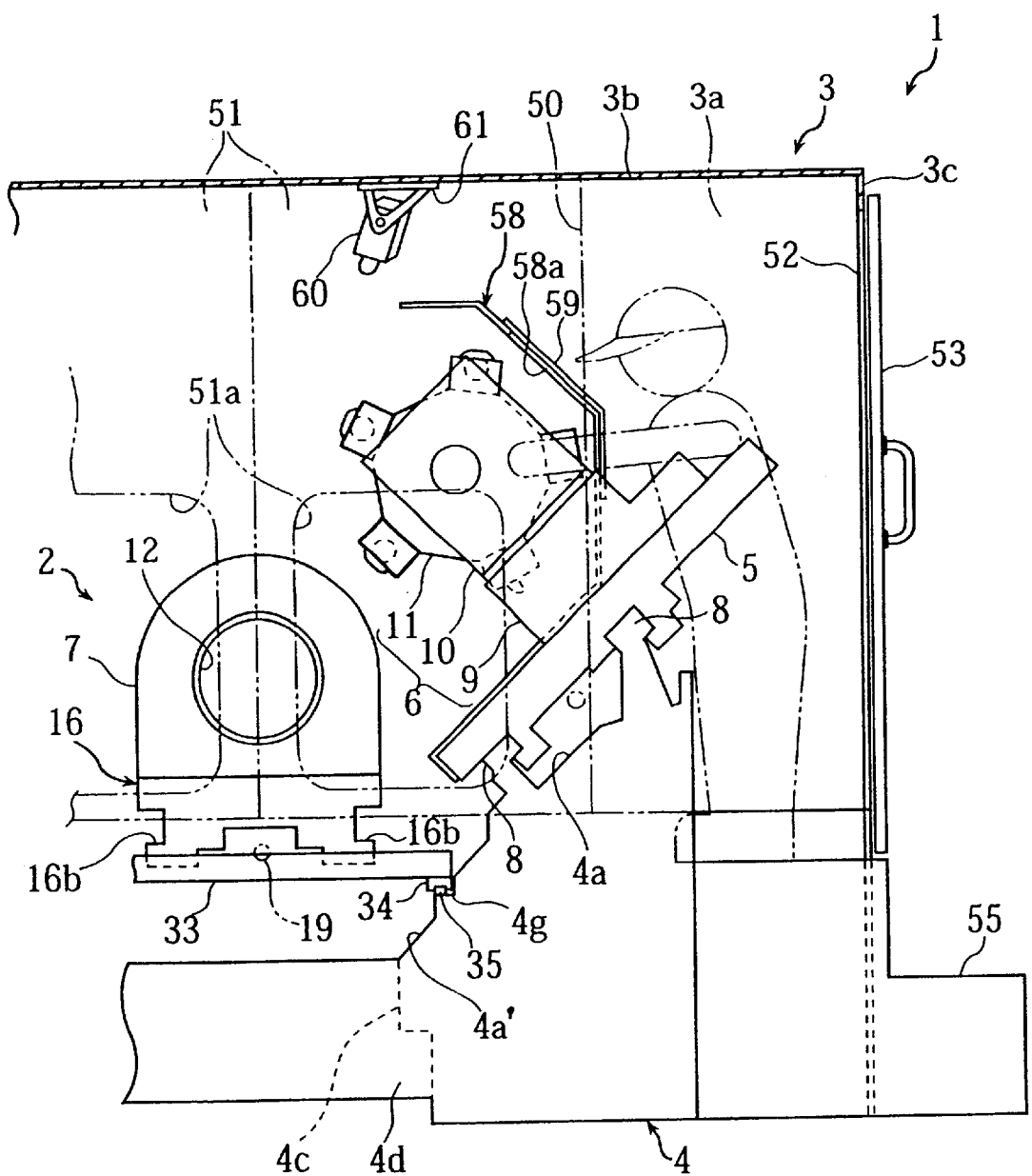
FIG. 3 is a front view of a cover provided on the machine body according to an embodiment of the invention.
Figure 4:
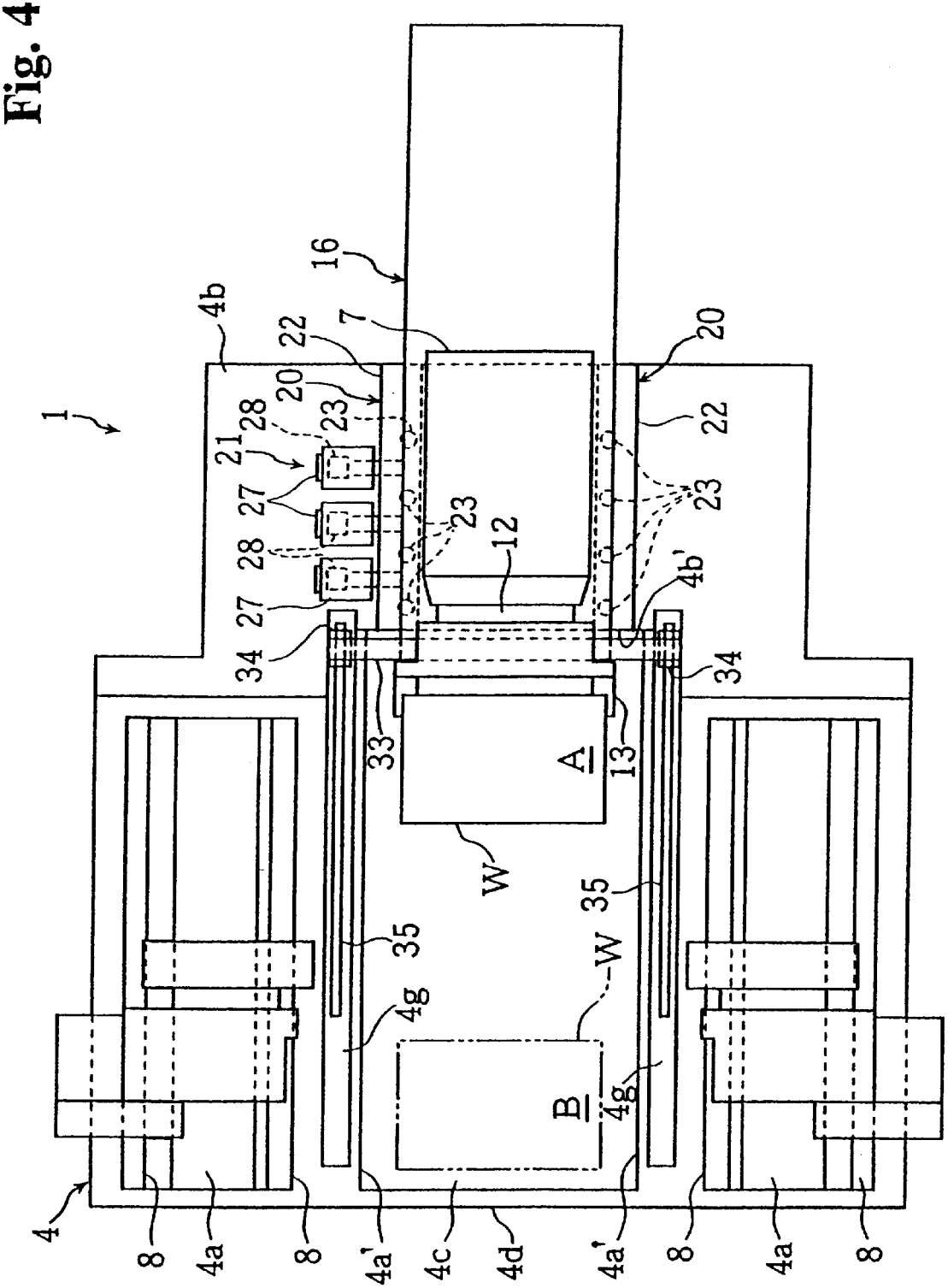
FIG. 4 is a plan view of the machine body according to an embodiment of the invention.

A cover 3, which is formed of an iron plate, covers the front-and-rear faces, left-and-right side faces and top face of the machine body 2 as shown in FIG. 3. An operational door opening 50 is formed in a front wall 3a of the cover 3 that covers the front face of the machine body 2. The door opening 50 has a lower edge set at a portion adjacent the headstock base 16, and an upper edge set at the front edge of a ceiling wall 3b.

The door opening 50 is provided with a pair of left-and-right front doors 51. Each front door 51 is supported so as to be slidable widthwise. The front doors 51 each have a window 51a with a transparent glass fitted thereto.

Side door openings 52 are formed in the left-and-right side walls 3c of the cover 3 that covers the left-and-right side faces of the machine body 2, respectively. Each of the door openings 52 is provided at a portion of the tool post 6 adjacent to the turret head 11 when the tool post 6 is in the standby position. The opening height and opening width of this door opening 52 are set to allow the operator to go in and out. A side door 53 for opening and closing the door opening 52 is provided on the side wall 3c, and the side door 53 is supported so as to be slidable in the back-and-forth directions.

A footstool 55 is provided at the door opening 52 so as to stretch over a range from an in-machine position beside the machine body 2 to an out-of-machine position outwardly from the side door 53. Use of this footstool 55 gives the operator's hands access from the door opening 52 to the tools of the turret head 11.

Around the left-and-right sloped portions 4a of the fixed bed 4, a protector device 58 formed of an iron plate is provided. This protector device 58 covers upwardly from the turret head 11 and in the vicinities of the carriages 5 of the sloped portions 4a, thereby preventing chips from entering the sliding portions of the carriages 5. An operational opening 58a is formed at a portion of the protector device 58 adjacent to the turret head 11. A sliding shutter 59 is provided at the operational opening 58a. Opening this shutter 59 allows the operator's hands to access the tools on the turret head 11.

For replacing the tools on the turret head 11, the operator opens the side door 53, steps up on the footstool 55, enters into the machine through the door opening 52, and opens the shutter 59 of the protector device 58.

The cover 3 is provided with a workpiece-machining-point display unit for verifying whether or not the contents of previously inputted machining programs are operating correctly. This workpiece-machining-point display unit is composed of a CCD camera 60 as an image pickup device provided inside the ceiling wall 3b of the cover 3, and a display (not shown) as an image display means provided on the front wall 3a of the cover 3. The CCD camera 60 is adjustably supported in various angles by a support bracket 61 fixedly attached to the ceiling wall 3b. An image of the workpiece W on the headstock 7 placed at the workpiece machining position A is then displayed on the display.

With the workpiece-machining-point display unit of this embodiment, since the CCD camera 60 is provided on the ceiling wall 3b of the cover 3 so that a workpiece W set on the headstock 7 is imaged and displayed on the display by the CCD camera 60, a machining point of the workpiece W can be ascertained by the image at a place separate from the workpiece without the need for visually checking the machining point directly from the machine outside through the window. This means that program checks can be accomplished easily and securely.

Then, in the NC lathe 1 of this embodiment, while the carriage 5 and the tool post 6 are moved in the Z- and X-axis directions, respectively, relative to each other, the workpiece W set on the spindle 12 is subjected to a specified cutting process. In this case, the workpiece W may be shaped either by the two tool posts 6 simultaneously or by each one tool post 6 alternately.

When the machining of the workpiece is completed, the carriage 5 and the tool post 6 move to a specified standby position, where the headstock base 16 is moved forward so that the headstock 7 is moved to the workpiece loading/unloading position B. At this workpiece loading/unloading position B, the machined workpiece is unloaded and the next workpiece is loaded. This workpiece replacement may also be done automatically by a robot.

As shown above, according to the NC lathe of this embodiment, since the headstock 7 is fixed to the headstock base 16 and since the headstock base 16 movable between the workpiece machining position A and the workpiece loading/unloading position B, the work of loading and unloading the workpiece W can be carried out in proximity to the operator on the front side of the fixed bed 4. This allows the workpiece loading/unloading replacement to be improved.

In this embodiment, since the door openings 52 are provided in the left-and-right side walls 3c of the cover 3 so as to be adjacent to the turret heads 11 of the tool posts 6, respectively, when the tool posts 6 are in their standby positions, and since the side doors 53 for opening and closing the openings 52 are provided, the work of replacing the tools of the turret heads 11 can be carried out at a location in proximity to the turret heads 11 provided in the side portions of the machine body 2. This means that the tool replacement workability is improved.

Also, since the operational opening 58a is formed in the protector device 58 provided on the in-machine side and since the shutter 59 for opening and closing the operational opening 58a is provided, the tool replacement work can be facilitated by opening the shutter 59. Further, the chips and coolant can be prevented from scattering by keeping the shutter 59 closed during machining.

With the chip processing unit of this invention, since the chip conveyor 44 is provided within the coolant tank 40, the sloped plate 45 is provided at the bottom portion, and since chips that have passed through the chip conveyor 44 are cleaned away to the downstream end portion 41d by the coolant, the chips can be prevented from being accumulated at the tank bottom.

Also, the chips cleaned-away in the coolant are filtered by the filter 47 and thus they can be periodically collected. This results in a relatively simple removal operation, and therefore the working efficiency discharging these chips can be improved.

Furthermore, since the coolant filtered by the filter 47 is collected to a separately placed clean tank, it becomes possible to supply the coolant in the clean tank to the machining part of the workpiece W, thus allowing the working efficiency for coolant collection to be enhanced.

Also in this embodiment, since the recessed portion 4c for use in chip collection is provided in the front portion of the fixed bed 4, since the tunnel 4e is provided in the flat portion 4b so as to extend rearwardly adjacent to the recessed portion 4c and be opened in the rear end wall 4f, and since the coolant tank 40 is provided within the chip-collecting recessed portion 4c and the tunnel 4e, it becomes possible to discharge the chips and coolant to a side opposite the operator. This means that neither the coolant tank 40 nor the chips interfere with the workpiece loading/unloading work and this improves the workability of the design.

With the headstock guide unit, since the rails 35 extending in the back-and-forth direction are fixedly bolted to the lower end portions 4a' of the left-and-right sloped portions 4a of the fixed bed 4, since the left-and-right guides 34 are fixed to the front end portion of the headstock base 16 via the support member 33, and since the guides 34 are slidably engaged with the rails 35, support rigidity and support strength of the headstock 7 at the workpiece machining position A can be ensured. Moreover the headstock 7 can be moved to the workpiece loading/unloading position B without any obstacles.

Also, even when the headstock base 16 overhangs during the workpiece loading/unloading process, the headstock base 16 can be securely supported by the slide of the guides 34 and the rails 35.

It is noted here that although the above embodiments have been described where the guide support mechanism comprises rails 35 and guides 34 slidably engaged with the rails 35, the guide support mechanism is not limited to this structure.

Figure 9:
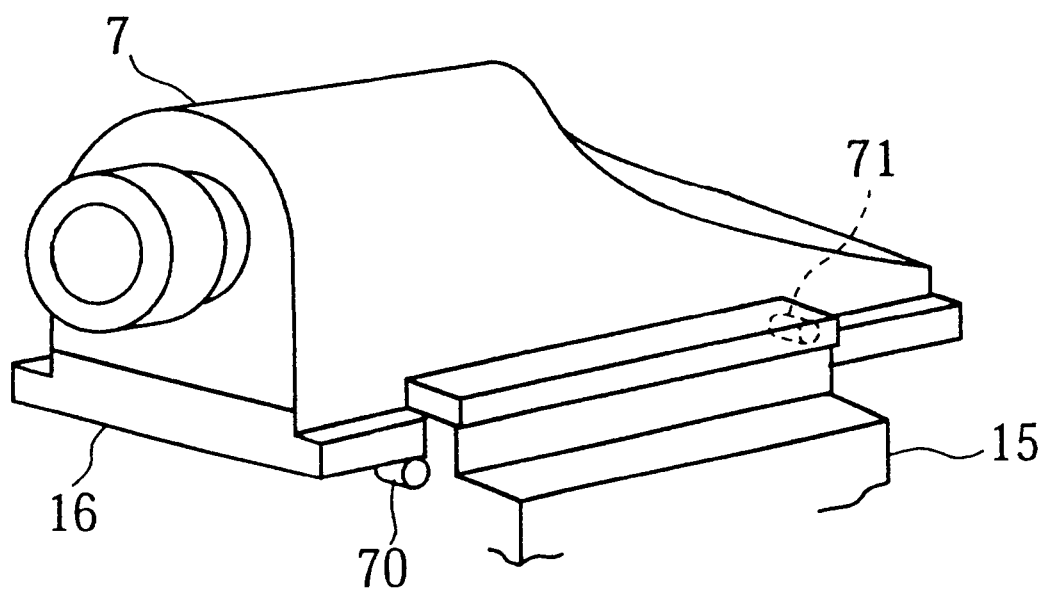
FIG. 9 is a perspective view showing a guide support mechanism according to another embodiment of the present invention.
Figure 10A:
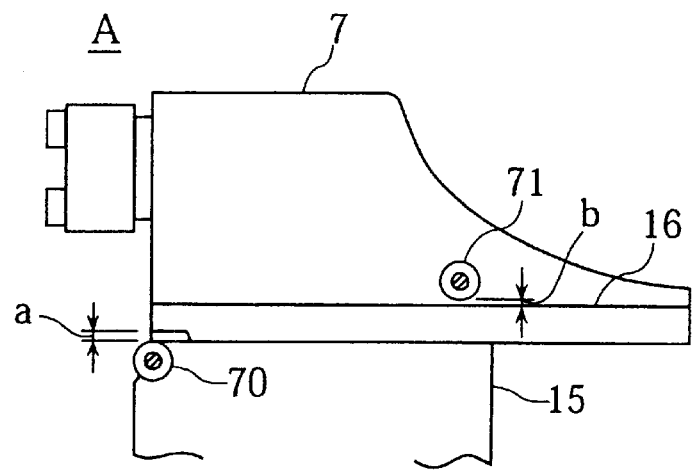
FIGS. 10A and 10B are schematic side views showing the operation of the guide support mechanism according to an embodiment of the invention.
Figure 10B:
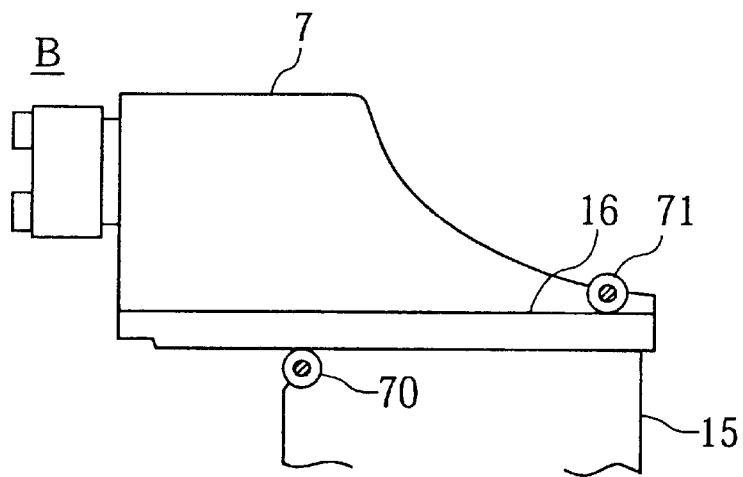
Figure 11:
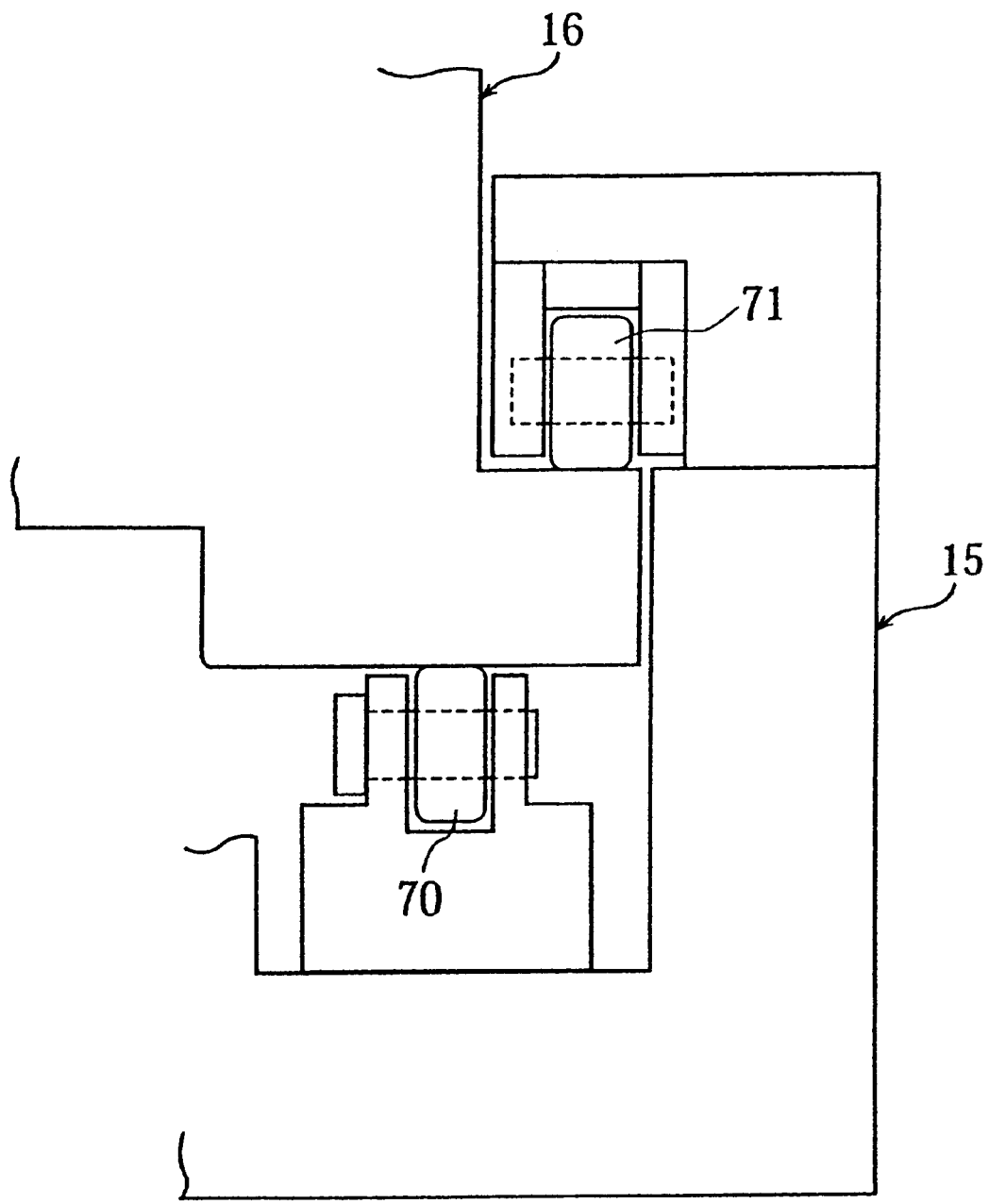
FIG. 11 is a front view of the guide support mechanism according to an embodiment of the invention.

FIGS. 9 through 11 are views explaining another embodiment of the guide support mechanism according to the present invention. In these figures, the reference numerals denote the same or similar component members as those used in FIG. 5.

In the guide support mechanism of this embodiment, first cam followers 70 can be disposed on left-and-right front end portions of a fixed base 15 fixed to the fixed bed 4. Further second cam followers 71 can be disposed on left-and-right rear end portions of the fixed base 15. The first cam followers 70 are in rolling contact with the lower surface of the headstock base 16 and the second cam followers 71 are in rolling contact with the upper surface of the headstock base 16.

A gap 'a' between the first cam followers 70 and the lower surface of the headstock base 16 at the workpiece machining position A is set to be about 0.1 mm. Also, a gap 'b' between the second cam followers 71 and the upper surface of the headstock base 16 is set to be about 0.03 mm (see FIG. 10A). By providing differences between the measurements of the gaps 'a' and 'b', the headstock base 16 can be securely supported even when there is a front-tilted state when the headstock is in the workpiece loading/unloading position B.

In this embodiment, since the first cam followers 70 are in rolling contact with lower-face front end portions of the headstock base 16 and the second cam followers 71 are in rolling contact with upper-face rear end portions of the headstock base 16, the headstock base 16 can be supported so as to be movable between the workpiece machining position A and the workpiece loading/unloading position B with a low cost and a simple construction.

It is to be understood that although the present invention has been described with regard to preferred embodiments thereof, various other embodiments and variants may occur to those skilled in the art, which are within the scope and spirit of the invention, and such other embodiments and variants are intended to be covered by the following claims.

The text of Japanese priority application no. 2000-281323 filed Sep. 18, 2000 is hereby incorporated by reference.

What is claimed is:

1. A machine tool comprising:

a fixed bed;

a carriage with a tool post mounted thereon is provided on the fixed bed on one side thereof closer to an operator;

a headstock is provided on another side of the fixed bed farther from the operator, wherein the headstock is connected to a front portion of an oblong shaped headstock base and a rear portion of the headstock base extends rearwardly from the fixed bed so as to protrude therefrom and the headstock and the headstock base being movable parallel to a longitudinal axis of the headstock and between:

a workpiece machining position for machining a workpiece on a side farther from the operator and a workpiece loading/unloading position for loading or unloading a workpiece on the side closer to the operator; and a chip collecting space disposed in a cut out portion of the fixed bed adjacent to the workpiece loading/unloading position; and a headstock guide unit comprising a guide support mechanism for supporting a front portion of the headstock base by the fixed bed when the headstock base is positioned at the workpiece machining position, and for supporting a rear portion of the headstock base by the fixed bed when the headstock base is positioned at the workpiece loading/unloading position.

2. A machine tool according to claim 1, wherein the guide support mechanism further comprises:

rails disposed so as to extend along left-and-right edge portions of the chip collecting space of the fixed bed; and guides disposed on the headstock base and slidably engaged with the rails.

3. A machine tool according to claim 1, wherein the guide support mechanism further comprises:

a first cam follower disposed on the fixed bed in rolling contact with a front lower surface of the headstock base; and a second cam follower disposed at a rear portion of the fixed bed, rearwardly of the first cam follower, in rolling contact with a rear upper surface of the headstock base.

4. A machine tool according to claim 2, wherein the guide support mechanism further comprises:

rails being disposed so as to extend along left-and-right edge portions of the chip collecting space in the fixed bed and the rails being disposed parallel to an axial direction of the spindle; and guides being disposed on the headstock base and being slidably engaged with the rails.

* * * * *